United States Patent [19]

Chalmer

[11] Patent Number: 5,066,311
[45] Date of Patent: Nov. 19, 1991

[54] FUEL PRODUCTS FROM WAST MATERIALS

[76] Inventor: Paul D. Chalmer, 5280 Westbury Rd., Chelsea, Mich. 48118

[21] Appl. No.: 539,186

[22] Filed: Jun. 18, 1990

[51] Int. Cl.$^5$ ............................................. C10L 5/00
[52] U.S. Cl. ...................................... 44/535; 44/534; 44/541
[58] Field of Search ................ 44/535, 519, 541, 534, 44/542; 431/289; D13/100

[56] References Cited

U.S. PATENT DOCUMENTS

| | | | |
|---|---|---|---|
| 3,852,046 | 12/1974 | Brown | 44/25 |
| 4,189,305 | 2/1980 | Clayton | 49/41 |
| 4,220,453 | 1/1980 | Holder | 44/10 B |
| 4,326,854 | 4/1982 | Tanner | 44/10 B |
| 4,810,255 | 3/1989 | Fay, III et al. | 44/534 |
| 4,810,256 | 3/1989 | Fay et al. | 44/14 |
| 4,818,249 | 4/1989 | Barrett, Jr. | 44/534 |

Primary Examiner—Prince E. Willis
Assistant Examiner—M. Nuzzolillo

[57] ABSTRACT

A heating fuel comprising a combustible material which can flow when heat is applied, with a wick covering the combustible material to assist and control combustion. The fuel can be made from materials found in ordinary household waste, using newspaper for the wick and polyethylene plastic for the combustible material. The fuel can be conveniently used if made in the form of approximately cylindrical logs, but with the diameters near the ends of the logs greater than the diameter near the middle, to provide air gaps when the logs are stacked. The combustible material can be made of plastic extruded into rods and embedded in a mass of dried pulped newspaper, with the outer surface of the mass having the desired log shape.

5 Claims, 1 Drawing Sheet

FUEL PRODUCTS FROM WAST MATERIALS

FIELD OF THE INVENTION

This invention relates to heating fuels, specifically to heating fuels made from waste materials, and in particular to fuel products intended for such uses as fireplaces, wood stoves, and wood furnaces.

BACKGROUND OF THE INVENTION

Many materials discarded as waste retain substantial potential heating value if burned as fuel. The use of waste as fuel has two benefits: the volume of solid waste needing final disposal can be reduced, and the heat obtained can help offset demand which would otherwise drain other energy resources.

In order for suitable waste materials to find actual use as fuels, they have to be convenient to use. Only if these materials are actually used will the effort and expense of separating these materials from the general waste stream be repaid.

Two of the largest components by volume of ordinary household waste are paper and plastic (particularly polyethylene, used in food packing, plastic bags, and for many other purposes). Both paper and polyethylene are potentially suitable for use as fuels. However, waste paper and waste plastic, if used by themselves in an unprocessed form, do not burn well in such applications as fireplaces, and wood stoves and furnaces.

Stacks of paper do not burn readily. Even if paper is rolled into cylinders, combustion is difficult to sustain once the outer layers have burned away. Separating the paper into individual sheets and crumpling the sheets can be useful for starting fires, but is inconvenient for sustaining a fire; paper in this form tends to burn too hot and too quickly, with the generation of large amounts of fly ash, and the danger of burning paper scraps being drawn up the chimney.

Adding plastic directly to a fire typically results in the plastic melting into a mass which burns slowly and incompletely after dripping to the bottom of the fire.

The use of paper and other fibrous or cellulosic materials in combination with various forms of plastic materials has been suggested for various types of fuel products. U.S. Pat. No. 3,852,046 to Brown (1974) describes mixing a slurry of shredded used paper with coarse plastic ribbons and allowing the sample to dry in a board like shape, with the resulting samples being readily ignitable and capable of burning well. U.S. Pat. No. 4,220,453 to Holder (1980) uses a combination of combustible cellulosic material and a curable (thermosetting) plastic binder to form log shaped articles in a tubular mold. U.S. Pat. No. 4,326,854 to Tanner (1982) uses various combinations of cellulosic materials together with a combustible binder to form synthetic firelogs by extrusion. U.S. Pat. No. 4,810,255 to Fay and Gierke (1989) uses a primary fuel element as an inner core, covered by a combustible layer comprising a thermoplastic material and pulp fiber.

An object of this invention is to combine materials such as paper and plastic into a product which is convenient and appealing to use for fuel.

Another object of this invention is a fuel product which can be made inexpensively and without unnecessary cost to the environment.

A further object of this invention is a fuel product which can be stacked like wood logs, having a shape which when stacked provides air gaps and interior spaces between the logs to help promote combustion of the stack.

SUMMARY OF THE INVENTION

In the present invention, a combustible material which can flow when heat is applied, such as a thermoplastic material, is surrounded by a wicking material, such as a dried pulp made from paper or other cellulosic material. Application of heat causes the combustible material to begin to flow into the wicking material. Dispersed into the wicking material, the combustible material burns well. The heat of combustion continues the process of dispersing the combustible material into the wick. After the combustible material has been consumed, the wicking material burns away, leaving a relatively small quantity of ash.

The principle is similar to that of an ordinary wax candle. Heat applied to the end of a candle causes wax to melt and flow into a fibrous wick inside the wax, which promotes the controlled burning of the wax.

In the present invention, the configuration is inverted, the wick being on the outside. When the material which flows into the wick is a high molecular weight plastic, rather than a lower molecular weight wax, it is advantageous to have a wick with greater surface area and bulk than a candle wick, since the plastic material will exhibit a higher viscosity than wax at a given temperature, and will tend to flow less readily.

As a wicking material, the preferred embodiment uses paper pulp formed by abrading waste paper or other cellulosic material in the presence of copious quantities of water. Newspaper produces a pulp with suitable characteristics.

As a combustible material, the preferred embodiment uses plastic which has been formed into rods or other elongated profiles, referred to as "cores". The plastic may be heated until soft and extruded through an appropriately shaped die to produce the cores.

It is advantageous to keep the plastic and the wicking material substantially separate until the product is used. Blending the two materials before forming the product, as for example by melting the plastic and combining with the wicking material, results in a composition which is significantly more difficult to extrude than plastic alone, requiring more expensive production equipment, and a more expensive process. In the preferred embodiment, the plastic is extruded without having been mixed with any substantial quantity of wicking material, except for small quantities of incidental materials, such as labels, which may be present in waste plastic.

In the preferred embodiment the cores are embedded in a mass of wet pulp, which is then pressed into the desired form and allowed to dry. FIG. 1 illustrates the preferred embodiment for use in fireplaces, wood stoves, and wood furnaces. It has the shape of a log which is approximately cylindrical, but which has a diameter near the ends of the cylinder which is greater than the diameter near the middle of the cylinder.

Stacking logs of this shape produces air gaps and interior spaces between the logs as illustrated in FIG. 3. This feature helps the stack burn by allowing air to flow past hot log surfaces facing each other in the interior of the stack.

The outer surface of the preferred embodiment comprises a series of ridges, as is visible in FIGS. 1 and 3, and, in cross section, in FIG. 2. This gives the surface an interesting appearance and texture, and provides additional surface area, further assisting the combustion process.

In the preferred embodiment, there is no plastic on the exterior surface of the log before the log is kindled. Dried pulp, in the ridged form of the preferred embodiment, has a dry, crisp feel, which many users may find appealing.

DETAILED DESCRIPTION OF THE PREFERRED EMBODIMENT

Figure 1:
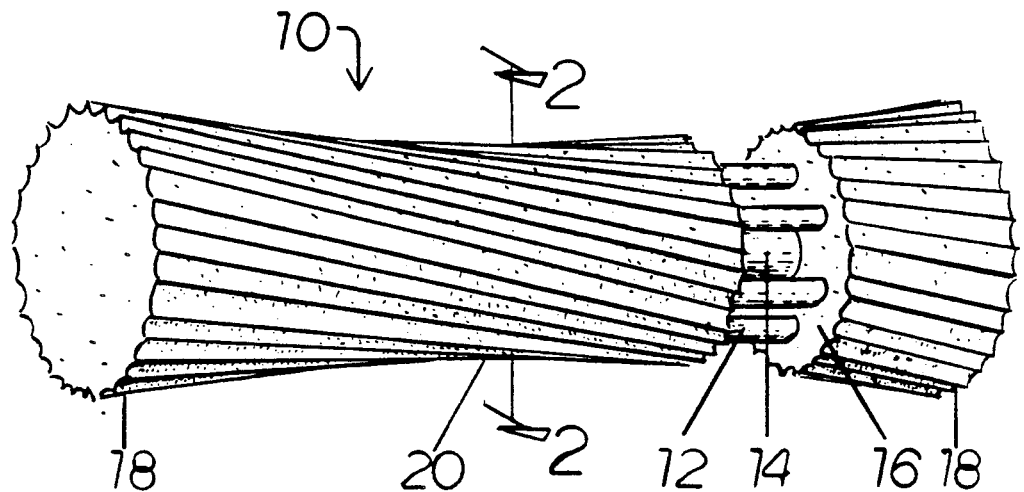
FIG. 1 shows an exterior view of the preferred embodiment in the form of a log, with a cutaway section showing embedded cores.
Figure 2:
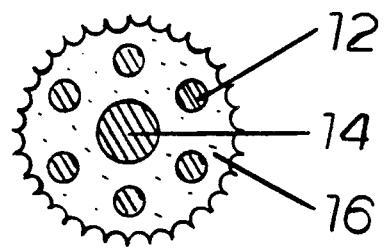
FIG. 2 shows a cross section through the middle of the log, illustrating the configuration of the cores.

The invention as illustrated in FIG. 1 in the form of a log 10 comprises rods of thermoplastic material embedded in a mass of wicking material. In this case, as shown in FIG. 2, the thermoplastic material is in the form of a set of smaller diameter rods, or outer cores 12, spaced around a larger diameter rod, or inner core 14. In the preferred embodiment, the thermoplastic material is completely surrounded by wicking material 16. The outer surface of the wicking material in the preferred embodiment is approximately cylindrical, but with the diameter near the ends of the cylinder 18 being greater than the diameter near the middle 20.

Figure 3:
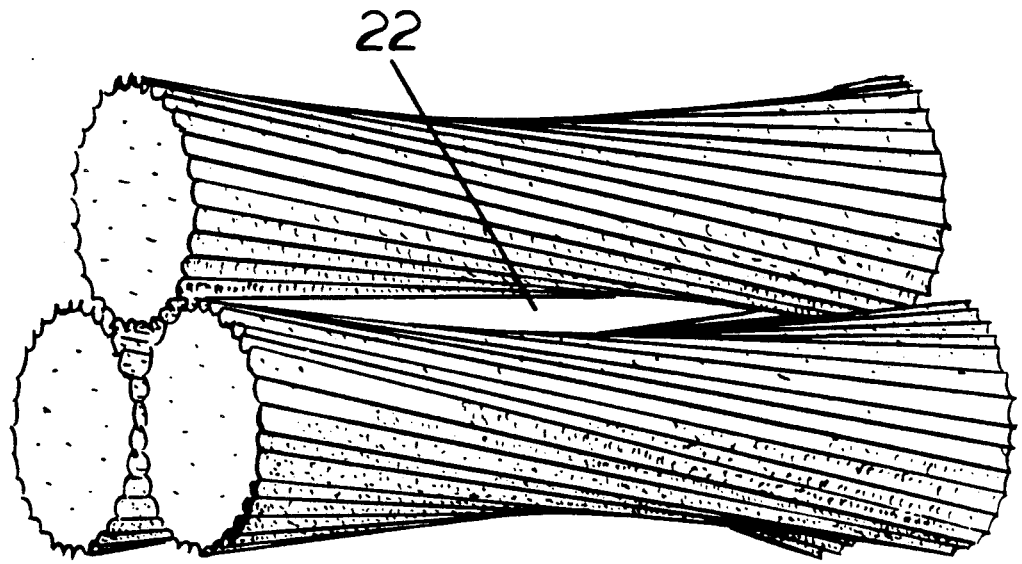
FIG. 3 shows a stack of three logs, indicating gaps between the logs through which air may circulate when the stack is burned.

A stack of three such logs is illustrated in FIG. 3. The ends of the top log rest upon the ends of the two lower logs. Because of the shape of the logs, gaps 22 are formed between each pair of logs. The interior space of the stack is partially enclosed by the inner portions of the surfaces of each of the three logs, separated by gaps.

To kindle the stack, heat may be applied in the form of a kindling flame, preferably in one of the gaps or in the interior space of the stack. The wicking material will begin to burn slowly, and will allow heat to be transmitted to the cores.

After sufficient heating, material from the cores will flow into the wicking material, and will begin to burn. This will cause additional material from the cores to begin to flow, continuing the process.

Heat radiated by the glowing inner surface of each log during combustion is partially absorbed by the surfaces of the logs facing it across the interior space. This helps to maintain the heat needed for combustion. The gaps between each pair of logs allow air to move through the interior space. This helps to supply the oxygen, also needed for combustion.

In the preferred embodiment, the wicking material comprises dried paper pulp. In this case, the log shrinks slowly during the combustion process. Burning continues, typically with a bright flame similar to that of burning wood, until most of the material in the cores had been consumed. When the cores are nearly exhausted, the wicking material burns away until a small residue of ash remains.

It is advantageous to have the thermoplastic material completely surrounded by wicking material. Exposed cores can melt outside the log, forming puddles which do not burn as readily as materials which has flowed into the wick. Exposed cores can also burn directly, but often produce a smokier flame than material which has flowed into the wick.

The invention can be made in a range of sizes, depending on the intended application. The shapes and sizes of the cores, and their positions in the mass of wicking material, can also be adjusted for specific applications.

The outer cores influence the kindling properties of the product. Smaller diameter cores will begin to flow more quickly, and will therefore kindle with the application of less intense heat, or with heat applied for a shorter duration, than will larger diameter cores the same distance from the surface of the log. However, to include the same weight of material in smaller cores requires more cores, increasing the difficulty of manufacturing the product.

The inner cores can provide a significant quantity of material required for sustaining combustion. It is advantageous to concentrate this material in one single core, or in a small number of relatively large cores.

The total amount of plastic contained in a log influences the overall duration of burning. The distribution of this material between inner and outer cores influences the intensity of burning as a function of time.

An embodiment which is suitable for use in fireplaces can be made with the following dimensions:

Exterior log dimensions of approximately 30.5 cm (12 inches) in length, with a diameter of approximately 7.9 cm (three and one-eigth inches) at the ends and a diameter of approximately 7.3 cm (two and seven-eighths inches) at the middle;

Outer cores approximately 25.4 cm (ten inches) long and approximately 0.95 cm (three-eighths inch ) in diameter;

Inner core approximately 25.4 cm (ten inches) long and approximately 1.7 cm (eleven-sixteenths inch) in diameter;

At least approximately 0.64 cm (one-quarter inch) from each core to the closest point on the outer surface of the wicking material;

A total of approximately one hundred grams of plastic contained in the outer cores, divided among approximately six cores;

Approximately fifty grams of plastic contained in a single inner core.

A stack of three logs with these dimensions and plastic content will burn for approximately one hour.

Products of other shapes and sizes, with other shapes, sizes and configurations of cores, are also within the scope of the invention.

One method for producing the preferred embodiment is as follows. A mold, or dowel pack, is constructed of substantially rigid rods, or dowels, of approximately equal length, placed side by side and fastened to a flexible strip running perpendicular to the axes of the dowels, each dowel being fastened near its middle.

The dowel pack is first constrained to lie in a horizontal plane with the flexible strip underneath. The ends of the dowels are aligned in a line perpendicular to the axes of the dowels. The dowel pack will therefore form a rectangle. The edges of the rectangle parallel to the axes of the dowels will be called the sides of the rectangle, and the edges of the rectangle perpendicular to the axes of the dowels will be called the ends of the rectangle.

A mass of wet pulp is placed on the dowel pack, and is pressed or rolled into a mat covering the dowel pack.

The mat may extend beyond the edges of the dowel pack. However, for this description, the mat will be considered to extend only to the edges of the dowel pack. The edges of the mat lying over the sides of the dowel pack will be called the sides of the mat, and the edges of the mat lying over the ends of the dowel pack will be called the ends of the mat.

The outer cores are then placed on the mat, parallel to the dowels, with the ends of the cores approximately equally distant from the ends of the mat, and with the cores spaced approximately equal distance apart.

Additional pulp is placed on the mat, covering the outer cores. If the mat had originally extended beyond the edges of the dowel pack, this additional pulp can be added by folding the mat along a line lying above an edge of the dowel pack, thus bringing material previously beyond the edge of the dowel pack to lie on top of material within the edges of the dowel pack. The material is then pressed or rolled, forming a thicker mat, with embedded cores.

The inner core is then placed on the surface of this mat, parallel to the dowels, with the ends of the core approximately equally distant from the ends of the mat.

The mat is then wrapped around the inner core by lifting the sides of the dowel pack and bringing them toward each other, so that the dowels are made to lie around the surface of an imaginary cylinder enclosing the pulp mass. Instead of bringing the sides of the dowel pack completely together, a separate set of parallel dowels, the tamper, may be placed between the sides of the dowel pack, completing the cylinder. This separate set of dowels can help tamp the two sides of the mat together.

The pulp mass containing the embedded cores is now in an approximately cylindrical shape, surrounded by dowels. End plates are placed against the ends of the pulp mass, approximately perpendicular to the axis of the cylinder described by the dowel pack.

The ends of the dowel pack are now twisted in opposite directions. This causes the ends of the dowel pack to flare out, while the diameter of the middle of the approximate cylinder described by the dowel pack decreases. This produces the log shape illustrated in FIG. 1.

The pulp mass is then compressed by applying pressure on the end plates. The flexible strip fastened to the dowel pack may be used to keep the diameter near the middle of the dowel pack from expanding during compression of the pulp mass.

After compression, one or both end plates are withdrawn, and the dowel pack is removed. The pulp mass, in the form of a log, is then dried. The log will substantially retain its shape if it rests upon one end, with its axis vertical, while drying. Drying may be assisted by placing the log in a warm air stream, or in sunshine.

After drying, the pulp mass will have become solid, and the log is ready for use.

The method has been described above as if the pulp mats used to form each log were produced separately. However, it is also possible to produce a continuous pulp mat strip, and to use a moving conveyor having a sequence of dowel packs spaced periodically along the conveyor. The stages of the process described above may be performed on the continuous pulp mat strip at stations located along the conveyor, up to the stage at which the pulp mat is to be wrapped around the inner core. The pulp mat strip is then cut at the ends of the dowel pack, and the process continues as described above.

Other methods may be used to make this product, and other operations may be used to carry out any of the stages in the mehtod described above, while remaining within the scope of this invention.

I claim:

1. A fuel article comprising: a combustible material having a covering, wherein said covering comprises cellulosic wick material and said combustible material comprises a thermoplastic material.

2. The fuel article of claim 1 wherein said covering completely surrounds said combustible material.

3. The fuel article of claim 1 wherein said covering is approximately cylindrical in shape.

4. The fuel article of claim 1 wherein said covering is approximately cylindrical in shape, having its diameter near each end greater than its diameter near the middle of the cylinder.

5. The fuel article of claim 1 wherein said combustible material is in the form of elongated rods.

* * * * *